March 8, 1949.　　　A. ALLISON　　　2,463,936
DYNAMOELECTRIC MACHINE

Filed March 18, 1947　　　　　　　3 Sheets-Sheet 1

Inventor
A. Allison
By Glenn R. Downing Seebold
Attys.

March 8, 1949. A. ALLISON 2,463,936
DYNAMOELECTRIC MACHINE
Filed March 18, 1947 3 Sheets-Sheet 2

Inventor
A. Allison
By Mason Downing Seebold
Attys.

March 8, 1949. A. ALLISON 2,463,936
DYNAMOELECTRIC MACHINE
Filed March 18, 1947 3 Sheets-Sheet 3
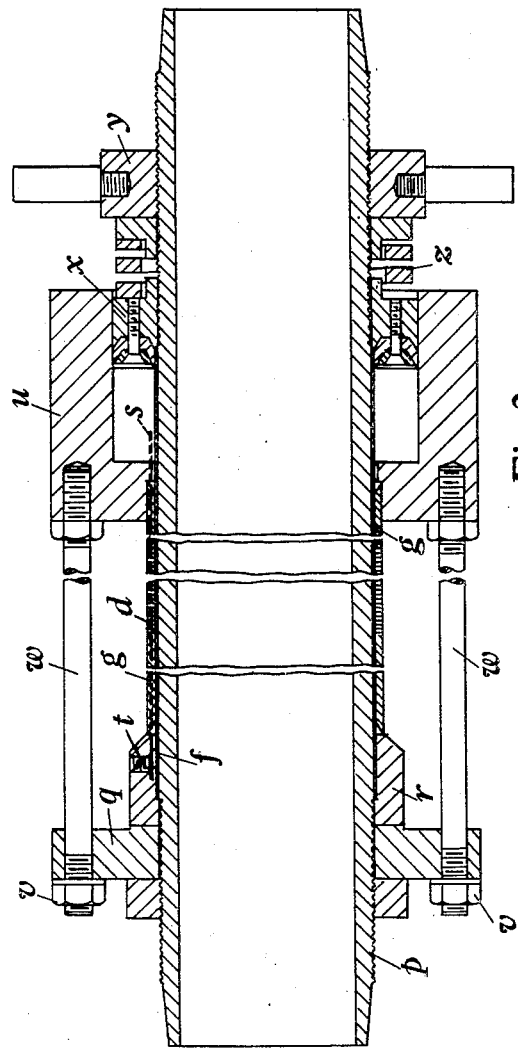
Inventor
A. Allison
By Downing & Leehle
Attys.

Patented Mar. 8, 1949

2,463,936

UNITED STATES PATENT OFFICE 2,463,936

DYNAMOELECTRIC MACHINE

Andrew Allison, Smethwick, near Birmingham, England, assignor to Chance Brothers Limited, Smethwick, near Birmingham, England Application March 18, 1947, Serial No. 735,414
In Great Britain March 21, 1946

4 Claims. (Cl. 172—36)

This invention relates to dynamoelectric machines, and particularly submersible motors, of the kind in which the stator windings are enclosed by a thin tubular sheath inserted in the stator. The object of the present invention is to provide an improved construction of the sheath retaining means.

In the accompanying drawings,

Figure 3 is a diagram illustrating one mode of assembling the sheath and the associated laminations.

Figure 1:
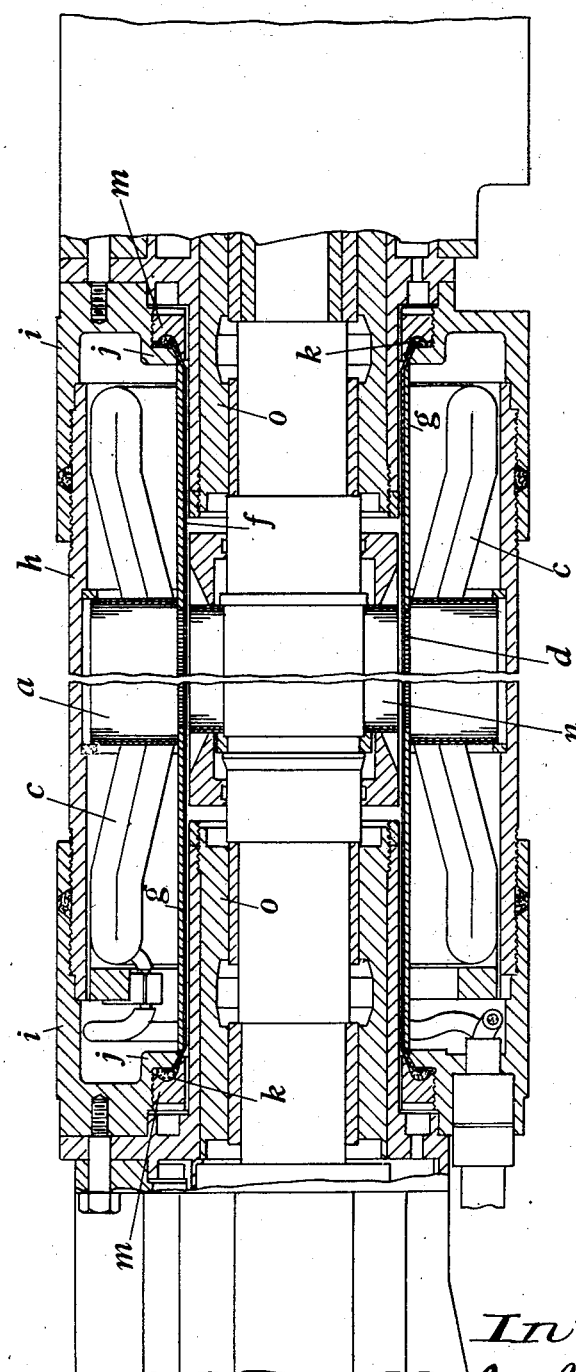
Figure 1 is a part sectional elevation of an electric motor embodying the invention.
Figure 2:
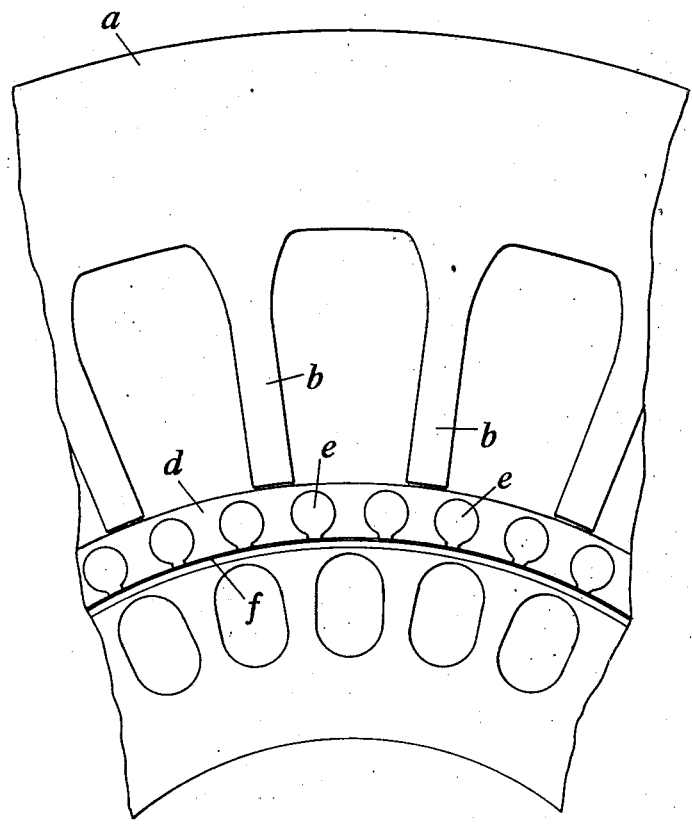
Figure 2 is an end elevation illustrating to a larger scale than Figure 1, a portion of the stator construction.

In carrying the invention into effect as shown by Figures 1 and 2, the stator comprises an assembly of annular laminations $a$ made from any suitable magnetic alloy of the kind usually employed in such machines, these being slotted to form the required pole pieces $b$ and to accommodate the stator windings $c$. For insertion within and in contact with the inner ends of the pole pieces $b$ I employ an assembly of annular laminations $d$ also made from magnetic material and adapted to fit closely against the inner ends of the pole pieces $b$. The laminations $d$ are formed with circular or other perforations $e$ which intersect the inner peripheries of the laminations. The size and disposition of the perforations $e$ in relation to the width of the laminations $d$ is such that the latter have high magnetic reluctance in the circumferential direction and low reluctance in the radial direction. Also the gap formed at each of the positions at which the inner periphery of the lamination is intersected by a perforation is preferably narrower than the main part of the perforation lying within the lamination.

In the construction illustrated, the thin tubular sheath $f$ is arranged in contact with the inner periphery of the perforated laminations $d$, and is made from stainless steel or other metal having high ohmic resistance. Usually the laminations $d$ are required to occupy only a central part along the length of the sheath. Along the other parts solid or laminated sleeves $g$ of any suitable material are mounted on the sheath. The sleeves are formed with holes corresponding to those in the laminations $d$.

Referring to Figure 1, it will be seen that the stator construction there shown comprises a cylindrical shell $h$ having secured thereto end covers $i$. Within the shell $h$ are mounted the laminations $a$ carrying the windings $c$, and in contact with the laminations $a$ are arranged the laminations $d$. At each side of the laminations $d$ are arranged the sleeves $g$, and within the parts $d$, $g$ is arranged the sheath $f$. The windings are completely enclosed in a chamber formed by the parts $h$, $i$, $d$, $g$, and $f$. The ends of the sheath $f$ may be secured to the end covers $i$ in any convenient manner. In the example shown they are splayed outwardly so that they can abut on shoulders $j$ on the end covers $i$, and are clamped by rubber or other sealing rings $k$ which are held in position by other end parts $m$ of the motor construction. The rotor $n$ is mounted within the stator in any convenient manner and is supported by bearings $o$.

The required bonding together of the laminations $d$, sleeves $g$, and sheath $f$, may be effected in accordance with the invention in any of a variety of essentially similar methods, all of which depend on the use of synthetic or other rubber, thermo-plastic, thermo-setting or analogous plastic materials inserted in the holes in the said parts. According to the method illustrated by Figure 3, I employ a hollow mandrel $p$ which is expansible slightly by heat or otherwise. On one end is secured a collar $q$ which supports a ring $r$ adapted to receive one end of the sheath $f$. After the sheath has been placed on the mandrel, with one end inserted within the ring $r$, one of the sleeves $g$ is placed in position. Then the laminations $d$ and finally the other sleeve $g$, are mounted in position. To effect the required relationship of the holes in the parts $d$ and $g$, wires $s$ are threaded through them. At one end these wires are secured by inserting them into holes in the ring $r$ and then clamping them by screws inserted in holes $t$ in the ring. By means of these wires the holes in the parts $g$, $d$ can be caused to be held assembled in alinement or relatively skewed.

After the parts $d$, $g$, and $f$, and the wires have been mounted on the mandrel as above described, a cylinder $u$ is placed on the mandrel, and the said parts, $d$, $g$, and $f$ are clamped together tightly by nuts $v$ on the rods $w$ which interconnect the ring $q$ and cylinder $u$. At this stage the wires $s$ are withdrawn.

The plastic material is contained in the cylinder $u$, and is forced therefrom into the holes in the parts $g$, $d$ by a piston $x$ which is advanced into the cylinder by rotating a ring $y$ in screw thread connection with the mandrel, the pressure of the ring being transmitted to the piston through a spring $z$. When the material is seen to escape at the end of the assembly remote from the cylinder, further extrusion of material from the cylinder is discontinued.

After shrinking of the mandrel by cooling or otherwise, the unit comprising the parts $d$, $g$, and $f$ is removed, and the plastic bonding material is subsequently hardened by vulcanisation, or other treatment.

Whilst for most purposes it is preferable to bond together all the three parts $d$, $g$, and $f$ as above described, it may for some purposes be sufficient to bond together only the laminations $d$ and sheath $f$, in which case the procedure above described is suitably modified, only the parts to be bonded being then placed on the mandrel.

In the foregoing example I have described a construction in which the perforations are arranged to intersect only the inner periphery of the annular laminations. If desired, however, the perforations may be such that some of them intersect the inner periphery and others the outer periphery, the one set of perforations being arranged to alternate with the others, or they may be relatively disposed in any other convenient order.

By this invention I am able to assemble and secure together the annular laminations $d$, sleeves $g$ (when used) and sheath $f$, in a very convenient and effective manner, which also allows the perforations in the laminations to be arranged in alinement or relatively skewed as desired. Moreover, the invention enables a very thin sheath to be effectively supported, against high fluid pressures, and also it provides all the desired protection to the stator windings against corrosive or other deleterious conditions.

Having thus described my invention what I claim as new and desire to secure by Letters Patent is:

1. A dynamoelectric machine stator having in combination an outer annular portion, an internal tubular sheath of thin metal, sheath-retaining means consisting at least in part of an assembly of annular laminations which surround said sheath and are situated within said outer annular portion, said laminations being formed with perforations which intersect at least the inner periphery of said laminations, and plastic material occupying said perforations and serving to bond together said laminations and sheath.

2. A dynamoelectric machine stator having in combination an outer annular portion, an internal tubular sheath of thin metal, sheath-retaining means consisting at least in part of an assembly of annular laminations which surround said sheath and are situated within said outer annular portion, said laminations being formed with perforations which intersect at least the inner periphery of said laminations and provide at said periphery gaps which are narrower than parts of said orifices lying within said laminations, and plastic material occupying said perforations and serving to bond together said laminations and sheath.

3. A dynamoelectric machine stator having in combination an outer annular portion, an internal tubular sheath of thin metal, sheath-retaining means consisting in part of an assembly of annular laminations which surround said sheath and are situated within said outer annular portion, and in part of sleeves mounted on said sheath at opposite sides of said laminations, said laminations and sleeves being formed with perforations which intersect at least the inner peripheries of said laminations and sleeves, and plastic material occupying said perforations and serving to bond together said sheath, laminations and sleeves.

4. A dynamoelectric machine stator comprising in combination a cylindrical shell, end covers on said shell, an assembly of annular laminations formed with internal pole pieces, windings mounted on said laminations, a second assembly of annular laminations arranged within the first mentioned assembly of laminations and in contact with the inner ends of said pole pieces, said second assembly of laminations being formed with perforations which intersect at least the inner periphery of said second assembly of laminations, a tubular sheath of thin metal extending through and supported by said second assembly of laminations, sleeves mounted on said sheath at opposite sides of said second assembly of laminations and formed with perforations similar to those of said second assembly of laminations, means securing the ends of said sheath to said end covers, and plastic material occupying the perforations in said second assembly of laminations and sleeves, and serving to bond together said second assembly of laminations, sheath and sleeves.

ANDREW ALLISON.

REFERENCES CITED

The following references are of record in the file of this patent:

UNITED STATES PATENTS

| Number | Name | Date |
|---|---|---|
| 1,449,371 | Apple | Mar. 27, 1923 |
| 1,852,805 | Frank | Apr. 5, 1932 |
| 1,870,236 | Chervenka | Aug. 9, 1932 |
| 1,908,620 | Zorzi | May 9, 1933 |
| 2,057,503 | Sawyer | Oct. 13, 1936 |
| 2,310,422 | Gold | Feb. 9, 1943 |
| 2,327,113 | Krotz | Aug. 17, 1943 |
| 2,351,329 | Gerstemmaier | June 13, 1944 |